(12) United States Patent
Xie et al.

(10) Patent No.: US 11,381,570 B2
(45) Date of Patent: Jul. 5, 2022

(54) IDENTITY AND ACCESS MANAGEMENT DYNAMIC CONTROL AND REMEDIATION

(71) Applicant: Beijing DiDi Infinity Technology and Development Co., Ltd., Beijing (CN)

(72) Inventors: Zaixin Xie, Los Gatos, CA (US); Zhiyong Qiu, Beijing (CN); Jiantao Zhang, Beijing (CN); Yuhong Huang, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 205 days.

(21) Appl. No.: 16/722,508

(22) Filed: Dec. 20, 2019

(65) Prior Publication Data

US 2021/0194884 A1    Jun. 24, 2021

(51) Int. Cl.
*H04L 9/40* (2022.01)
*G06F 21/31* (2013.01)
*G06N 20/00* (2019.01)

(52) U.S. Cl.
CPC .......... *H04L 63/102* (2013.01); *G06F 21/316* (2013.01); *G06N 20/00* (2019.01); *H04L 63/20* (2013.01); *H04L 63/0815* (2013.01)

(58) Field of Classification Search
None
See application file for complete search history.

(56) References Cited

U.S. PATENT DOCUMENTS

| 2017/0070521 A1* | 3/2017 | Bailey ..................... H04L 41/20 |
| 2019/0020676 A1* | 1/2019 | Laughlin ............... G06F 21/316 |
| 2019/0306138 A1 | 10/2019 | Carru et al. |

FOREIGN PATENT DOCUMENTS

| CN | 107368718 A | 11/2017 |
| CN | 109255211 A | 1/2019 |
| CN | 109756458 A | 5/2019 |

OTHER PUBLICATIONS

PCT International Search Report and the Written Opinion dated Mar. 16, 2021, issued in related International Application No. PCT/CN2020/137598 (10 pages).

* cited by examiner

*Primary Examiner* — Cai Y Chen
(74) *Attorney, Agent, or Firm* — Sheppard Mullin Richter & Hampton LLP

(57) ABSTRACT

Identity and access management may update and remediation may be performed dynamically. Historical user behavior data may be obtained. An account specific baseline based on the historical user behavior data may be generated. An access request may be received from a current user. Current user behavior data associated with a current user may be obtained. The current user behavior data may be compared to the account specific baseline. It may be determined whether the current user behavior data satisfies the account specific baseline. If the current user behavior data satisfies the account specific baseline, an access may be granted to the current user. If the current user behavior data does not satisfy the account specific baseline, access may be denied to the current user.

15 Claims, 5 Drawing Sheets

IDENTITY AND ACCESS MANAGEMENT DYNAMIC CONTROL AND REMEDIATION

TECHNICAL FIELD

The disclosure relates generally to single-sign-on (SSO) and identity and access management (IAM) technologies.

BACKGROUND

Existing SSO and IAM technologies focus on account and access provisioning. Access privileges may be provisioned to users of an enterprise system so that users may access required resources. There is a need for improved clean-up of obsolete and dormant accounts. There is also a need for tighter provisioning and remediation of access privileges.

SUMMARY

Various embodiments of the specification include, but are not limited to, systems, methods, and non-transitory computer readable media for identity and access management.

In various implementations, a method may include obtaining historical user behavior data, and generating an account specific baseline based on the historical user behavior data. The method may further include receiving an access request from a current user, and obtaining current user behavior data associated with a current user. The method may further include comparing the current user behavior data to the account specific baseline. If the current user behavior data satisfies the account specific baseline, an access may be granted to the current user. If the current user behavior data does not satisfy the account specific baseline, the current user may be denied access.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include obtaining historical user behavior data, and generating an account specific baseline based on the historical user behavior data. The operations may further include receiving an access request from a current user, and obtaining current user behavior data associated with a current user. The operations may further include comparing the current user behavior data to the account specific baseline. If the current user behavior data satisfies the account specific baseline, an access may be granted to the current user. If the current user behavior data does not satisfy the account specific baseline, the current user may be denied access.

Yet another aspect of the present disclosure is directed to a non-transitory computer-readable storage medium configured with instructions executable by one or more processors to cause the one or more processors to perform operations. The operations may include obtaining historical user behavior data, and generating an account specific baseline based on the historical user behavior data. The operations may further include receiving an access request from a current user, and obtaining current user behavior data associated with a current user. The operations may further include comparing the current user behavior data to the account specific baseline. If the current user behavior data satisfies the account specific baseline, an access may be granted to the current user. If the current user behavior data does not satisfy the account specific baseline, the current user may be denied access.

In some embodiments, the historical user behavior data may include at least one user access log and at least one access prepattern.

In some embodiments, the access may include activating a new account associated with the current user or granting a privilege to the current user.

In some embodiments, comparing the current user behavior data to the account specific baseline may include determining if there is an anomaly between the current user behavior data and the account specific baseline. Denying the access to the current user may include performing, if there is an anomaly, a remediation associated with the current user.

In some embodiments, the remediation may include deactivating an account associated with the current user or suspending a privilege from the current user.

In some embodiments, the account specific baseline may be dynamically updated based on a machine learning model. The machine learning model may be trained by the historical user behavior data.

In some embodiments, generating the account specific baseline may include obtaining at least one static rule, and generating the account specific baseline based on the historical user behavior data and the at least one static rule.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

DETAILED DESCRIPTION

Various embodiments will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

The approaches disclosed herein improve functioning of computing systems that manage accounts and access control. Access may be granted or denied based on static rules and dynamic behavioral analysis. For example, a static rule based mechanism may include IAM auditing. IAM auditing may include a global password expiry policy and an account inactivity deactivation setting. Static rule-based mechanisms are good at granting more and more users more and more access with blanket IAM policies. Traditional SSO and IAM may provision access based on requests for the access.

IAM may dynamically be controlled and remediation may be performed based on real time user access behavioral analysis using machine learning. Dynamic behavioral analysis may provide more effective and timely account and access control based on ever-changing business needs and a "least privilege" principle. A remediation mechanism may be used to ensure the most effective security principle of the least privilege, while providing just-in-time user account activation with the proper access privilege when needed, where needed. Rapidly changing business needs may be taken into account through user login and access pattern evolution overtime. Adaptive insights into user access needs and the underlying ever-changing business dynamics may be automatically established and maintained.

Figure 1:
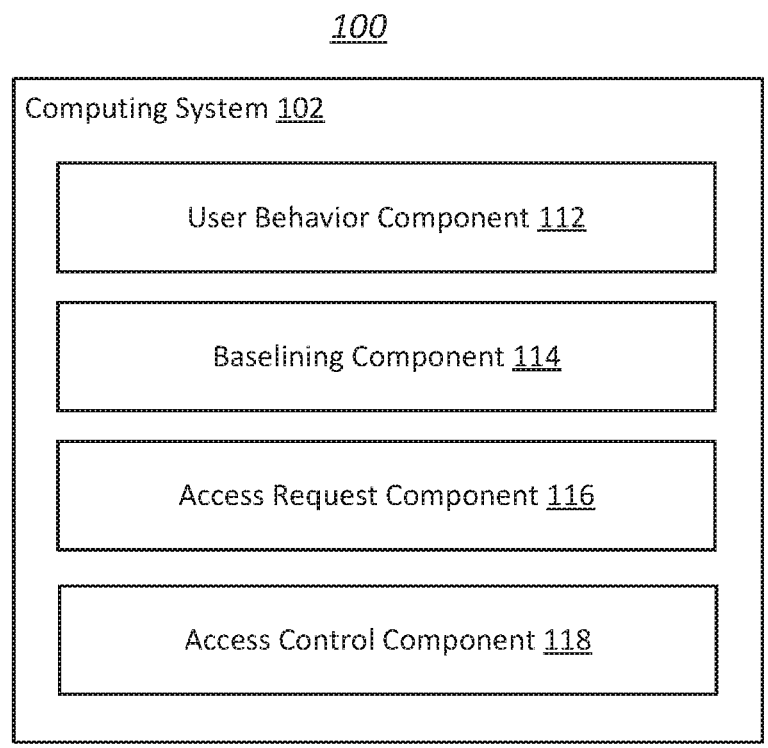
FIG. 1 illustrates an exemplary environment for identity and access management, in accordance with various embodiments.

FIG. 1 illustrates an example environment 100 for identity and access management, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks) to other computing resources.

The computing system 102 may include a user behavior component 112, a baselining component 114, an access request component 116, and an access control component 118. The computing system 102 may include other components. While the computing system 102 is shown in FIG. 1 as a single entity, this is merely for ease of reference and is not meant to be limiting. One or more components or one or more functionalities of the computing system 102 described herein may be implemented in a single computing device or multiple computing devices. In some embodiments, one or more components or one or more functionalities of the computing system 102 described herein may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network. The computing system 102 may be implemented on or as various devices such as mobile phone, tablet, server, computer, wearable device (smart watch), etc. The system 102 above may be installed with appropriate software (e.g., platform program, etc.) and/or hardware (e.g., wires, wireless connections, etc.) to access other devices of the environment 100.

The user behavior component 112 may be configured to obtain historical user behavior data. Obtaining data may include one or more of accessing, acquiring, analyzing, determining, examining, identifying, loading, locating, opening, receiving, retrieving, reviewing, storing, or otherwise obtaining the file information. The historical user behavior data may include data for an entire user base. A user profile may be created for each user. User information may be collected, and the user profile may dynamically update in real time. Users may be grouped based on user characteristics. Examples of user characteristics include business units, function or position role, and employment status (e.g., full time equivalent, part time, contractor, intern).

In some embodiments, the historical user behavior data may include at least one user access log and at least one access prepattern. For example, user access logs may be obtained by recording user access activities in real time (e.g., once every second, once every minute). User access activities may include logging into an account, logging out of an account, requesting heighted access privileges, accessing restricted data through an account, and other access patterns. In another example, access prepatterns may be obtained by recording actions taken by users prior (e.g., the past 10 actions, the past minute) to performing a user access activity.

The user behavior component 112 may further be configured to obtain current user behavior data associated with a current user. The current user behavior data may be maintained separately (e.g., is main memory, in a cache, in a buffer) from the historical user behavior data. This may allow the current user behavior data to quickly be accessed to perform access control. The current user behavior data may be updated in real time as a user performs access activities. The current user behavior data may be added to the historical user behavior data.

The baselining component 114 may be configured to generate an account specific baseline based on the historical user behavior data. The account specific baselines may correspond with the user access patterns of a specific type of users. Different account specific baselines may be maintained for each specific type of user. Baselines may be updated using real time user access activity log information. As a result, baselines may dynamically model user access patterns for the whole user base. The baselines may be used as templates for future account and access provisioning, access anomaly detection, and continuous and automatic account and access auditing and remediation. In some embodiments, baselines may initially be created based on static rules and policies. For example, access scores may be computed each time a user accesses a resource based on the access pattern. The account specific baselines may be computed by averaging the access scores for a specific type of user. In another example, baselines may include the most frequent access pattern for a specific type of user.

In some embodiments, the account specific baseline may be dynamically updated based on a machine learning model. The machine learning model may be based on the historical user behavior data. For example, historical user behavior data from a specific type of users may be fed into the machine learning model in real time in order to establish the account specific baseline. The machine learning model may establish and maintain adaptive insights into user-specific login and access baselines on a per user basis. Dynamically tuned modeling of user access patterns may be created for the entire user base using user access patterns of different types of users, and using real time user access activity log information.

The access request component 116 may be configured to receive an access request from a current user. In some embodiments, the access request may include a request for activating a new account associated with the current user. In some embodiments, the access request may include a request an additional privilege. In some embodiments, the access request may include a request for access to specific data. In some embodiments, the access request may include any other user access activity. Computing system 102 may receive multiple access requests from multiple users at the same time. Each user may be treated as a separate current user, and each request may be treated as a separate access request.

The access control component 118 may be configured to compare the current user behavior data to the account specific baseline. The access control component 118 may further be configured to grant an access to the current user if the current user behavior data satisfies the account specific baseline. In some embodiments, the access may include activating a new account associated with the current user or granting a privilege to the current user. The access control component 118 may further be configured to deny the access to the current user if the current user behavior data does not satisfy the account specific baseline.

In some embodiments, comparing the current user behavior data to the account specific baseline may include determining if there is an anomaly between the current user behavior data and the account specific baseline. For example, an anomaly may be detected based on comparing the current user behavior data to the account specific baseline. If the current user behavior data has greater than a threshold variance from the account specific baseline, the current access request may be considered anomalous. In some embodiments, comparing the current user behavior data to the account specific baseline may include feeding the current user behavior data a trained machine learning model. The output of the machine learning model may indicate whether or not the current access request is anomalous. In some embodiments, user access requests may be flagged with high or low confidence. The access control component 118 may constantly monitor for anomalies for the entire user base.

In some embodiments, the access control component 118 may further be configured to perform a remediation associated with the current user if there is an anomaly. In some embodiments, the remediation may include deactivating, suspending, or locking an account associated with the current user. In some embodiments, the remediation may include suspending or revoking a privilege from the current user. For example, if an access request has been flagged with high confidence that it is anomalous, access may automatically be revoked from the current user. In another example, if an access request has been flagged with low confidence that it is anomalous, notice may be provided to an administrator. As a result, login and access anomalies may be detected. In some embodiments, the remediation may include suspending or revoking a privilege from the current user. For example, a user may be granted access to certain functionalities, and denied access to other functionalities. Account and access auditing and remediation may be performed continuously and automatically.

In some embodiments, generating an account specific baseline may include obtain at least one static rule. Static rules may include rule and policy based access control based on regulations (e.g., industry compliance) and company policy (e.g., internal compliance). For example, a static rule may include a period of time (e.g., a preset period of time, a period of time for which an account is inactive). In some embodiments, the account specific baseline may be generated based at least one static rule. In some embodiments, static rules may be used to initially determine if access should be granted. For example, a user type for new user may be unknown. As a result, the current user behavior data may be compared to the at least one static rule. Remediation may be performed if a static rule is violated. For example, access may be denied.

In some embodiments, the access control component 118 may support just-in-time user account activation and access privilege provisioning. For example, when an access need arises for a user, a user account may be activated for a reasonable period of time and access privileges may be granted only for the function needed to be performed during that period of time. The account may become deactivated and/or access privileges may be suspended based on policies, insights, and intelligence of a combination of static rules, real-time user access patterns, and evolving business needs.

Figure 2:
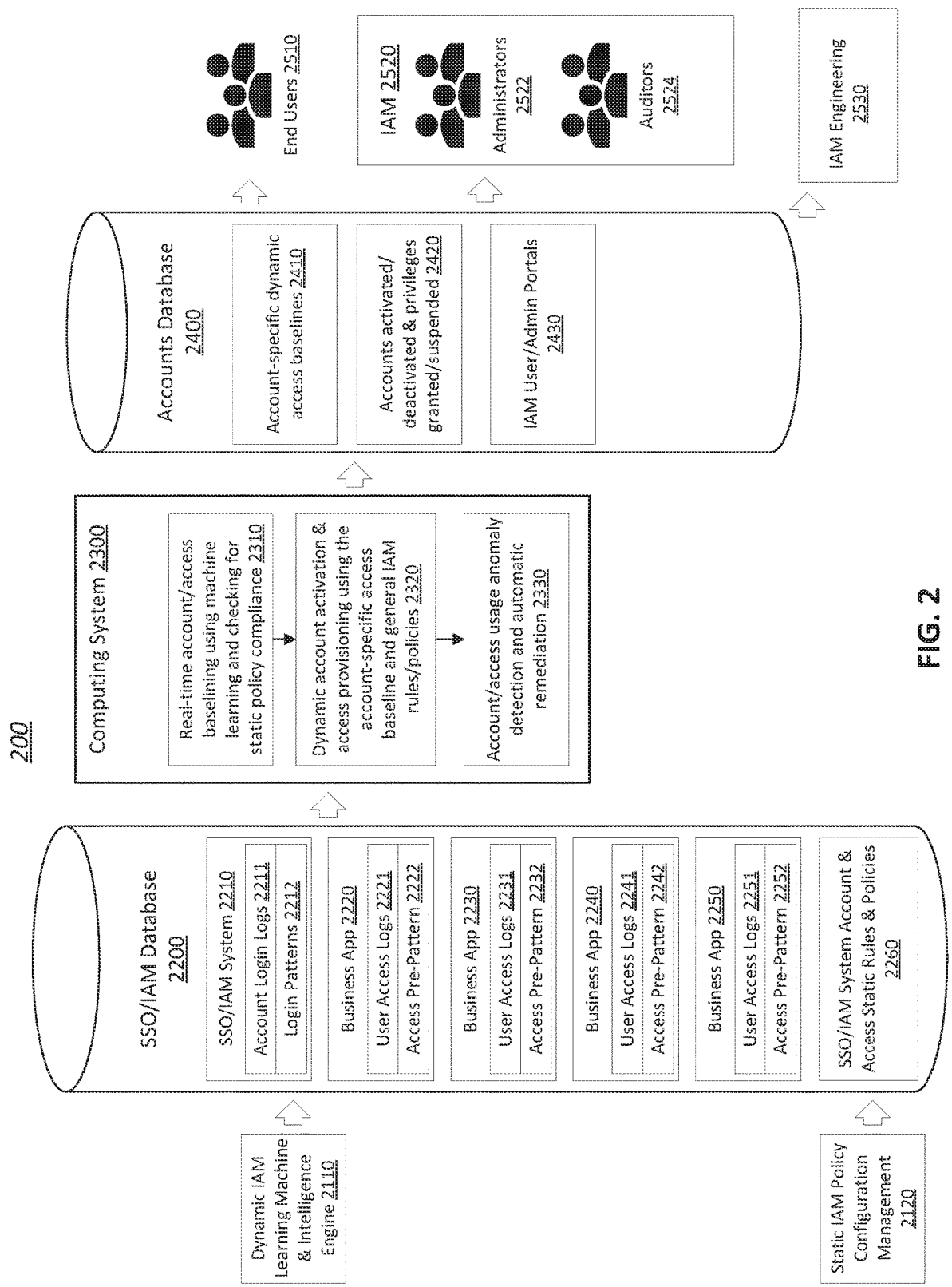
FIG. 2 illustrates an exemplary method for identity and access management, according to various embodiments.

FIG. 2 illustrates an example method 200 for identity and access management, according to various embodiments of the present disclosure. The method 200 may be implemented in various environments including, for example, the environment 100 of FIG. 1. The operations of the method 200 presented below are intended to be illustrative. Depending on the implementation, the method 200 may include additional, fewer, or alternative steps performed in various orders or in parallel. The method 200 may be implemented in various computing systems or devices including one or more processors.

In some embodiments, SSO/IAM database 2200 may receive data from dynamic IAM learning machine & intelligence engine 2110 and static IAM policy configuration management 2120. The data received from dynamic IAM learning machine & intelligence engine 2110 may include data associated with SSO/IAM system 2210, business app 2220, business app 2230, business app 2240, and business app 2250. The data associated with SSO/IAM system 2210 may include account login logs 2211 and login patterns 2212. The data associated with business app 2220 may include user access logs 2221 and access prepattern 2222. The data associated with business app 2230 may include user access logs 2231 and access prepattern 2232. The data associated with business app 2240 may include user access logs 2241 and access prepattern 2242. The data associated with business app 2250 may include user access logs 2251 and access prepattern 2252. Dynamic IAM learning machine & intelligence engine 2110 may constantly collect data and send the data to SSO/IAM database 2200 in real time (e.g., once every second, once every minute). SSO/IAM database 2200 may store the received data in the logs before the data is sent to computing system 2300. The data received from static IAM policy configuration management 2120 may include SSO/IAM system account & access static rules & policies 2260.

Computing system 2300 may receive data from SSO/IAM database 2200. In some embodiments, computing system 2300 may correspond with computing system 102. In some embodiments, computing system 2300, SSO/IAM database 2200, and accounts database 2400 may be included in computing system 102. At 2310, the received data may be used for real-time account and access baselining and checked for static policy compliance. For example, a dynamic baseline may be determined by continuously feeding user access logs 2221, 2231, 2241, and 2241, and access prepatterns 2222, 2232, 2242, and 2252 into a machine learning model. In another example, compliance with static rules and polices may be determined by comparing user access logs 2221, 2231, 2241, and 2241, and access prepatterns 2222, 2232, 2242, and 2252 with SSO/IAM system account & access static rules & policies 2260. At 2320, accounts may dynamically be activated or deactivated, and privileges may dynamically be granted or suspended based on the account-specific access baseline and general IAM rules and policies. At 2330, account or access usage anomalies may be detected and automatic remediation may be performed. For example, anomalies may be detected by continuously comparing user behaviors to the dynamic baseline. If an anomaly is detected, remedial action may occur.

Accounts database 2400 may store data output from computing system 2300. Account-specific dynamic access baselines 2410 may be received as a result of the real-time account and access baselining at 2310. Multiple dynamic access baselines which are specific to user accounts may be stored and updated as new baselines are generated. Accounts activated/deactivated & privileges granted/suspended 2420 may store the status of whether accounts are activated or deactivated, and which privileges have been granted or denied to each account. The status of accounts and privileges may be updated based on the result of the dynamic account activation and access provisioning at 2320. In addition, the status of accounts and privileges may be updated based on a remedial action at 2330. Accounts database 2400 may additionally store IAM user and admin portals 2430. For example, portals may be used to monitor the access management system and view the status of individual accounts.

End users 2510 may receive the dynamic baselines and the status of accounts and privileges. As a result, the end users 2510 may be granted or denied access. IAM 2520 may include administrators 2522 and auditors 2524. Administrators 2522 and auditors 2524 may be provided with access to IAM user and admin portals 2430. IAM engineering 2530 may have access to all the data stored in SSO/IAM database 2200 and accounts database 2400.

Figure 3:
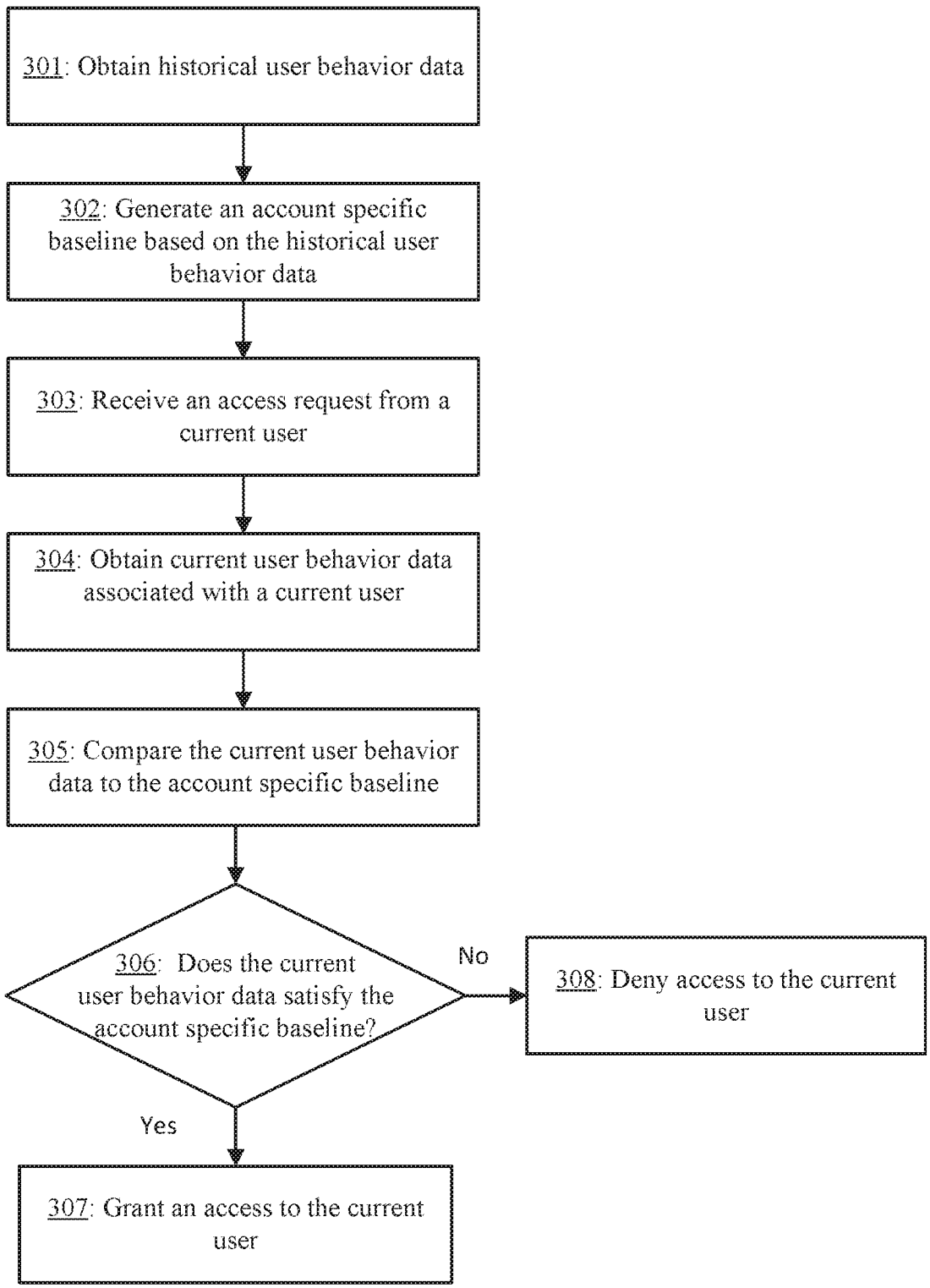
FIG. 3 illustrates a flowchart of an exemplary method for identity and access management, according to various embodiments.

FIG. 3 illustrates a flowchart of an example method 300, according to various embodiments of the present disclosure. The method 300 may be implemented in various environments including, for example, the environment 100 of FIG. 1. The method 300 may be performed by computing system 102. The operations of the method 300 presented below are intended to be illustrative. Depending on the implementation, the method 300 may include additional, fewer, or alternative steps performed in various orders or in parallel. The method 300 may be implemented in various computing systems or devices including one or more processors.

With respect to the method 300, at block 301, historical user behavior data may be obtained. At block 302, an account specific baseline based on the historical user behavior data may be generated. At block 303, an access request may be received from a current user. At block 304, current user behavior data associated with a current user may be obtained. At block 305, the current user behavior data may be compared to the account specific baseline. At block 306, it may be determined whether the current user behavior data satisfies the account specific baseline. If the current user behavior data satisfies the account specific baseline, the method may proceed to block 307. If the current user behavior data does not satisfy the account specific baseline, the method may proceed to block 308. At block 307, an access may be granted to the current user. At block 308, access may be denied to the current user.

Figure 4:
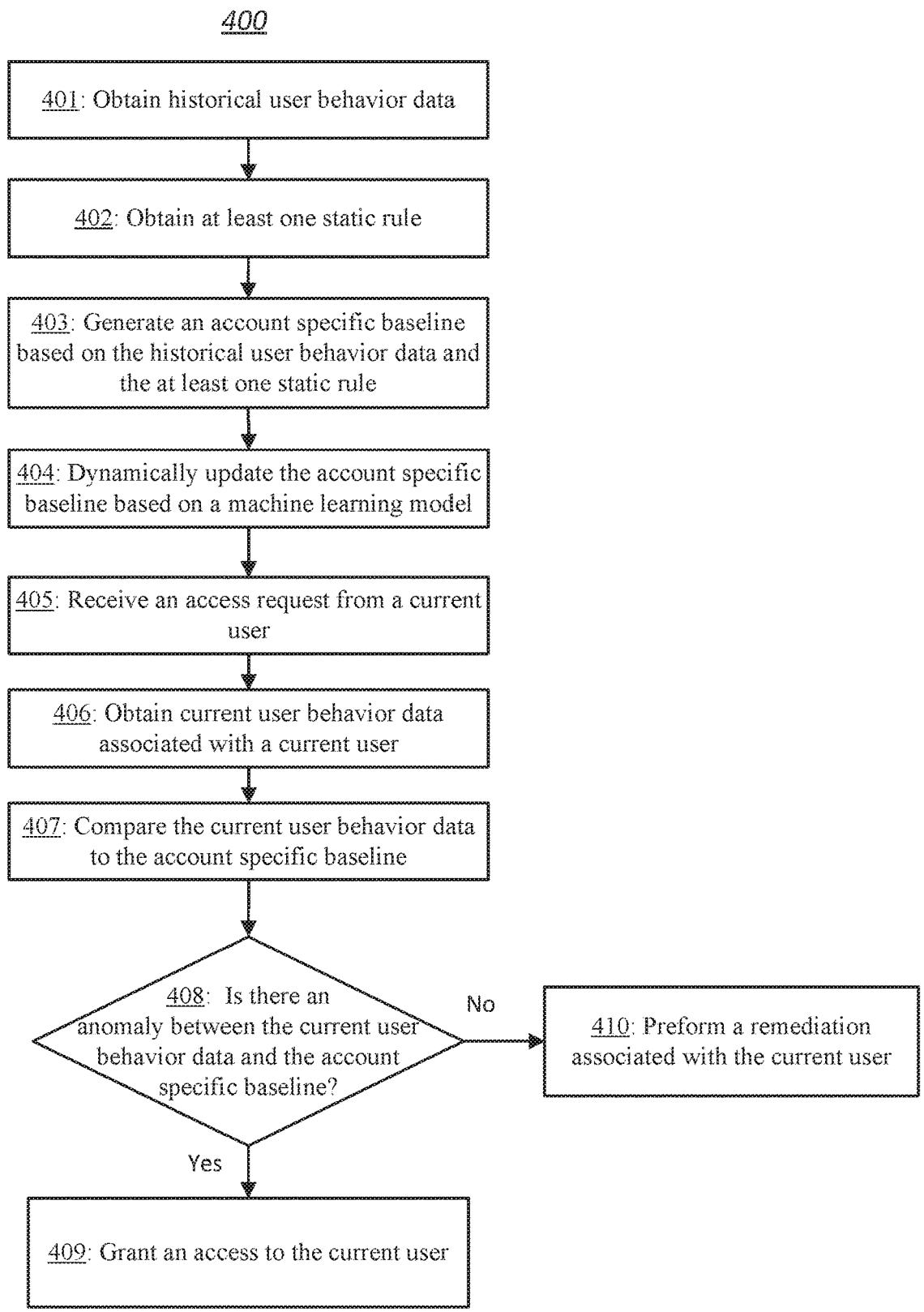
FIG. 4 illustrates a flowchart of an exemplary method for identity and access management, according to various embodiments.

FIG. 4 illustrates a flowchart of an example method 400, according to various embodiments of the present disclosure. The method 400 may be implemented in various environments including, for example, the environment 100 of FIG. 1. The method 400 may be performed by computing system 102. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

With respect to the method 400, at block 401, historical user behavior data may be obtained. At block 402, at least one static rule may be obtained. At block 403, an account specific baseline may be generated based on the historical user behavior data and the at least one static rule. At block 404, the account specific baseline may be dynamically update based on a machine learning model. The machine learning model may be trained based on the historical user behavior data and the at least one static rule. New data may be fed into the machine learning model as it is received. The machine learning model may output the account specific baseline. At block 405, an access request may be received from a current user. At block 406, current user behavior data associated with a current user may be obtained. At block 407, the current user behavior data may be compared to the account specific baseline. At block 408, it may be determined if there is an anomaly between the current user behavior data and the account specific baseline. If there is an anomaly between the current user behavior data and the account specific baseline, the method may proceed to block 409. If there is not an anomaly between the current user behavior data and the account specific baseline, the method may proceed to block 410. At block 409, an access may be granted to the current user. At block 410, a remediation associated with the current user may be performed.

Figure 5:
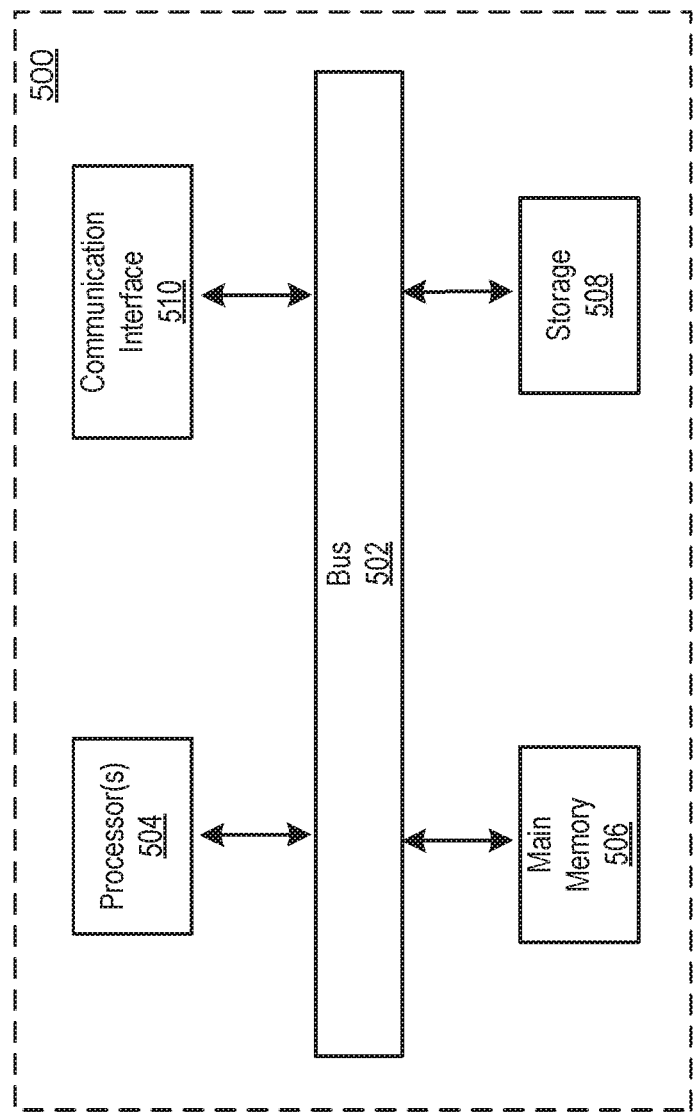
FIG. 5 is a block diagram that illustrates a computer system upon which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. Main memory 506 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH- EPROM, NVRAM, any other memory chip or cartridge, and networked versions of the same.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 508. Execution of the sequences of instructions contained in main memory 506 causes processor(s) 504 to perform the process steps described herein.

For example, the computing system 500 may be used to implement the computing system 102, the user behavior component 112, the baselining component 114, the access request component 116, and the access control component 118 shown in FIG. 1. As another example, the process/method shown in FIGS. 2-4 and described in connection with this figure may be implemented by computer program instructions stored in main memory 506. When these instructions are executed by processor(s) 504, they may perform the steps of methods 200, 300, and 400 as shown in FIG. 2-4 and described above. In alternative embodiments, hard-wired circuitry may be used in place of or in combination with software instructions.

The computer system 500 also includes a communication interface 510 coupled to bus 502. Communication interface 510 provides a two-way data communication coupling to one or more network links that are connected to one or more networks. As another example, communication interface 510 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A method for identity and access management, comprising:
obtaining historical user behavior data corresponding to a plurality of user types;
generating, using a machine learning model, a plurality of user-type specific baselines for the plurality of user types based on the historical user behavior data, wherein each user-type specific baseline comprises a user access pattern of a specific user type;
receiving an access request from a current user;
determining a user type of the current user based on a static rule;
determining an account specific baseline based on the user type of the current user and the plurality of user-type specific baselines;
obtaining current user behavior data associated with the current user;
comparing the current user behavior data to the account specific baseline;
granting, if the current user behavior data satisfies the account specific baseline, an access to the current user;
denying, if the current user behavior data does not satisfy the account specific baseline, the access to the current user;
inputting, in real-time, the current user behavior data associated with the current user into the machine learning model; and
updating, in real-time, one of the plurality of user-type specific baselines corresponding to the user type of the current user using the machine learning model based on the current user behavior data associated with the current user.

2. The method of claim 1, wherein the historical user behavior data comprises at least one user access log and at least one access prepattern.

3. The method of claim 1, wherein the access comprises at least one of: activating a new account associated with the current user or granting a privilege to the current user.

4. The method of claim 1, wherein comparing the current user behavior data to the account specific baseline comprises determining if there is an anomaly between the current user behavior data and the account specific baseline; and
wherein denying the access to the current user comprises performing, if there is an anomaly, a remediation associated with the current user.

5. The method of claim 4, wherein the remediation comprises at least one of: deactivating an account associated with the current user or suspending a privilege from the current user.

6. A system for identity and access management, comprising one or more processors and one or more non-transitory computer-readable memories coupled to the one or more processors and configured with instructions executable by the one or more processors to cause the system to perform operations comprising:

obtaining historical user behavior data corresponding to a plurality of user types;

generating, using a machine learning model, a plurality of user-type specific baselines for the plurality of user types based on the historical user behavior data, wherein each user-type specific baseline comprises a user access pattern of a specific user type;

receiving an access request from a current user;

determining a user type of the current user based on a static rule;

determining an account specific baseline based on the user type of the current user and the plurality of user-type specific baselines;

obtaining current user behavior data associated with the current user;

comparing the current user behavior data to the account specific baseline;

granting, if the current user behavior data satisfies the account specific baseline, an access to the current user;

denying, if the current user behavior data does not satisfy the account specific baseline, the access to the current user;

inputting, in real-time, the current user behavior data associated with the current user into the machine learning model; and updating, in real-time, one of the plurality of user-type specific baselines corresponding to the user type of the current user using the machine learning model based on the current user behavior data associated with the current user.

7. The system of claim 6, wherein the historical user behavior data comprises at least one user access log and at least one access prepattern.

8. The system of claim 6, wherein the access comprises at least one of: activating a new account associated with the current user or granting a privilege to the current user.

9. The system of claim 6, wherein comparing the current user behavior data to the account specific baseline comprises determining if there is an anomaly between the current user behavior data and the account specific baseline; and wherein denying the access to the current user comprises performing, if there is an anomaly, a remediation associated with the current user.

10. The system of claim 9, wherein the remediation comprises at least one of: deactivating an account associated with the current user or suspending a privilege from the current user.

11. A non-transitory computer-readable storage medium configured with instructions executable by one or more processors to cause the one or more processors to perform operations comprising:

obtaining historical user behavior data corresponding to a plurality of user types;

generating, using a machine learning model, a plurality of user-type specific baselines for the plurality of user types based on the historical user behavior data, wherein each user-type specific baseline comprises a user access pattern of a specific user type;

receiving an access request from a current user;

determining a user type of the current user based on a static rule;

determining an account specific baseline based on the user type of the current user and the plurality of user-type specific baselines;

obtaining current user behavior data associated with the current user;

comparing the current user behavior data to the account specific baseline;

granting, if the current user behavior data satisfies the account specific baseline, an access to the current user;

denying, if the current user behavior data does not satisfy the account specific baseline, the access to the current user;

inputting, in real-time, the current user behavior data associated with the current user into the machine learning model; and updating, in real-time, one of the plurality of user-type specific baselines corresponding to the user type of the current user using the machine learning model based on the current user behavior data associated with the current user.

12. The non-transitory computer-readable storage medium of claim 11, wherein the historical user behavior data comprises at least one user access log and at least one access prepattern.

13. The non-transitory computer-readable storage medium of claim 11, wherein the access comprises at least one of: activating a new account associated with the current user or granting a privilege to the current user.

14. The non-transitory computer-readable storage medium of claim 11, wherein comparing the current user behavior data to the account specific baseline comprises determining if there is an anomaly between the current user behavior data and the account specific baseline; and wherein denying the access to the current user comprises performing, if there is an anomaly, a remediation associated with the current user.

15. The non-transitory computer-readable storage medium of claim 14, wherein the remediation comprises at least one of: deactivating an account associated with the current user or suspending a privilege from the current user.

* * * * *